US009067159B2

(12) United States Patent
Soderholm et al.

(10) Patent No.: US 9,067,159 B2
(45) Date of Patent: Jun. 30, 2015

(54) POCKET FILTER ASSEMBLY

(75) Inventors: Andreas Soderholm, Alingsas (SE); Ove Karrnas, Svanesund (SE)

(73) Assignee: OKR Invest AB, Svanesund (SE)

( * ) Notice: Subject to any disclaimer, the term of this patent is extended or adjusted under 35 U.S.C. 154(b) by 104 days.

(21) Appl. No.: 13/641,531

(22) PCT Filed: Apr. 19, 2011

(86) PCT No.: PCT/SE2011/050480
§ 371 (c)(1),
(2), (4) Date: Oct. 16, 2012

(87) PCT Pub. No.: WO2011/133098
PCT Pub. Date: Oct. 27, 2011

(65) Prior Publication Data
US 2013/0031885 A1 Feb. 7, 2013

(30) Foreign Application Priority Data

Apr. 20, 2010 (SE) .................................... 10003986

(51) Int. Cl.
*B01D 46/02* (2006.01)
*B01D 46/00* (2006.01)
(52) U.S. Cl.
CPC .......... *B01D 46/0002* (2013.01); *B01D 46/023* (2013.01)
(58) Field of Classification Search
CPC .. B01D 46/0002; B01D 46/02; B01D 46/023; B01D 46/06; B01D 2271/02; Y10S 55/12; Y10S 55/31
USPC ........... 55/378, 379, 483, 484, 492, 506, 508, 55/DIG. 12, DIG. 31
See application file for complete search history.

(56) References Cited

U.S. PATENT DOCUMENTS 3,834,134 A * 9/1974 McAllister ...................... 55/378
4,213,771 A * 7/1980 Guibet ............................ 55/483
(Continued)

FOREIGN PATENT DOCUMENTS

DE 8122276 U1 10/1981
DE 8308859 U1 7/1983
(Continued)

OTHER PUBLICATIONS

International Search Report, corresponding to PCT/SE2011/050480, date of completion of this report Jul. 8, 2011.
(Continued)

*Primary Examiner* — Duane Smith
*Assistant Examiner* — Minh-Chau Pham
(74) *Attorney, Agent, or Firm* — Renner, Otto, Boisselle & Sklar, LLP

(57) ABSTRACT

The present invention relates to a gas filter assembly includes a support frame and a number of filter pockets. The support frame includes a first subframe and a second subframe connected to each other by means of at least one locking element, the first and second subframe constituting the inner wall, the front face and outer wall of the support frame when connected together. Each filter pocket has an air inlet opening at one end defined by opposing sides each having an edge. The filter pockets are sealingly secured to each other by means of at least one connecting means bridging between, and extending along substantially the entire length of the edges of two adjacent filter pockets. The at least one connecting means has two opposite end portions, each end portion being arranged between said first and second subframes.

11 Claims, 6 Drawing Sheets

(56) References Cited

U.S. PATENT DOCUMENTS

| | | |
|---|---|---|
| 4,325,718 A | 4/1982 | Burkhead |
| 5,554,203 A * | 9/1996 | Borkent et al. ............... 55/378 |
| 5,611,830 A | 3/1997 | Ernst |
| 6,451,079 B1 * | 9/2002 | Lange et al. ............... 55/379 |
| 8,029,585 B2 * | 10/2011 | Sundvik et al. ............... 55/378 |

FOREIGN PATENT DOCUMENTS

| | | |
|---|---|---|
| JP | H04 9619 U | 1/1992 |
| WO | 96/29138 | 9/1996 |
| WO | 98/37945 A1 | 9/1998 |
| WO | 99/36155 | 7/1999 |
| WO | 2006/126937 A1 | 11/2006 |

OTHER PUBLICATIONS

International Preliminary Report on Patentability, corresponding to PCT/SE2011/050480, date of completion of this report Mar. 30, 2012.

* cited by examiner

POCKET FILTER ASSEMBLY

TECHNICAL FIELD

The present invention relates to a gas filter assembly of cassette type having a square or rectangular design, intended to be used in a filtering unit for removing contaminations from a gas or air flow. The gas filter assembly comprises a support frame and one or more filter pockets sealingly attached to the support frame in a dust free manner.

BACKGROUND OF THE INVENTION

Several types of gas filter cassette units are known. For instance in WO 9629138 the support frame comprises profile sections of a flexible material, preferably of a plastic material, wherein the leg members are hingedly interconnected with the frame web portion. The leg members are provided with locking means and are pivoted into a clamping engagement with each other, securing the filter bags between the clamped leg members. Carrier beams extend between oppositely positioned frame side pieces supporting the filter bags in the folds. Also WO99/36155 discloses a gas filter cassette unit having frame profiles that are articulately connected to each other so that when closed, they clamp the filter material between them. The support frame is provided with a plurality of rod-like means connecting two opposite supporting frame parts with each other, supporting the filter bags preventing them from collapsing in strong draught. The seam between two adjacent filter pockets extends along the entire length of the rod-like means and is clamped to the rod-like means by an elongated strip provided with spikes directed backwards.

A different type of gas filter cassette unit is disclosed in U.S. Pat. No. 6,451,079 wherein the assembly exhibits an outer frame of plastic material and several individual filter elements, each of which comprises an inner frame, arranged inside the outer frame. The outer frame is composed of opposing limb profiles, a base profile and a closing profile, each of which have an essentially U-shaped cross section. The filter elements are pushed into the U-shaped limb profiles of the outer frame and are connected to each other in a dust free manner.

WO2006/126937 discloses a pocket filter assembly comprising a frame structure having a number of filter pocket openings wherein each filter pocket has a pocket mouth sealingly secured in a corresponding filter pocket opening. The frame structure comprises an outer sub-frame and a corresponding inner sub-frame connected and locked to each other by means of locking elements at locking positions distributed along the opening portions of the subframes defining the filter pocket openings.

The main objective of the present invention is to provide a gas filter assembly that is inexpensive, easy to produce, assemble and mount. Yet it is important that the support frame is stable and that the filter pockets are firmly connected to the frame. A further object has been to provide a gas filter assembly comprising various types of material that can be easily separated to be subsequently subjected to destruction or recycling as required.

SUMMARY OF THE INVENTION

The present invention relates to a gas filter assembly comprising a support frame and a number of filter pockets, said support frame comprising a first subframe and a second subframe connected to each other by means of at least one locking element, said first and second subframe constituting an inner wall, a front face and an outer wall of the support frame when connected together, each filter pocket having an air inlet opening at one end defined by opposing sides each having an edge. The filter pockets are sealingly secured to each other by means of at least one connecting means bridging between and extending along substantially the entire length of the edges of two adjacent filter pockets. The at least one connecting means has two opposite end portions, each end portion being arranged between said first and second subframes.

Each end portion (219) of the connecting means (216) extends through cut-in portions in the inner wall of the first subframe and rests in slots arranged in the second subframe.

The support frame of the invention is square or rectangular and the first subframe and second subframe are each designed as one piece in order to offer a better stability.

The slots on the second subframe may be V-shaped so as to secure each end of the connecting means in a clamping grip when the strips are placed in the slots.

The connecting means may be an elongated clamping strip and the top side of the connecting means facing the air flow may have a rounded shape which permits the connecting means to be made from a lighter and thinner material while still being able to resist bending or crumpling in strong draught. A further advantage of the rounded shape is that the pressure drop created at the air inlets is lower with this particular rounded design.

The connecting means may be connected to the filter pockets by spot welding or gluing to further secure the filter pockets to the connecting means.

The filter pockets sealingly secured by the connecting means have a peripheral upper edge and said peripheral upper edge may be fixed to the second subframe by means of hooking means. Such hooking means may be a serrated edge, a row of spikes or similar.

The peripheral upper edge may be further secured to the support frame by means of a partition on the first subframe pressing the peripheral upper edge into a groove arranged onto the second subframe.

Two peripheral sides of the support frame may be provided with cut-in portions and slots.

Four peripheral sides of the support frame may be provided with cut-in portions and slots.

The number of slots and cut-in portions arranged on transversally extending inner walls of the support frame may be different from the number of slots and cut-in portions arranged on the longitudinally extending inner walls. This feature will make the support frame more flexible as it can be arranged to hold pocket filter assemblies having different numbers of filter pockets.

DETAILED DESCRIPTION OF THE INVENTION

Figure 1:
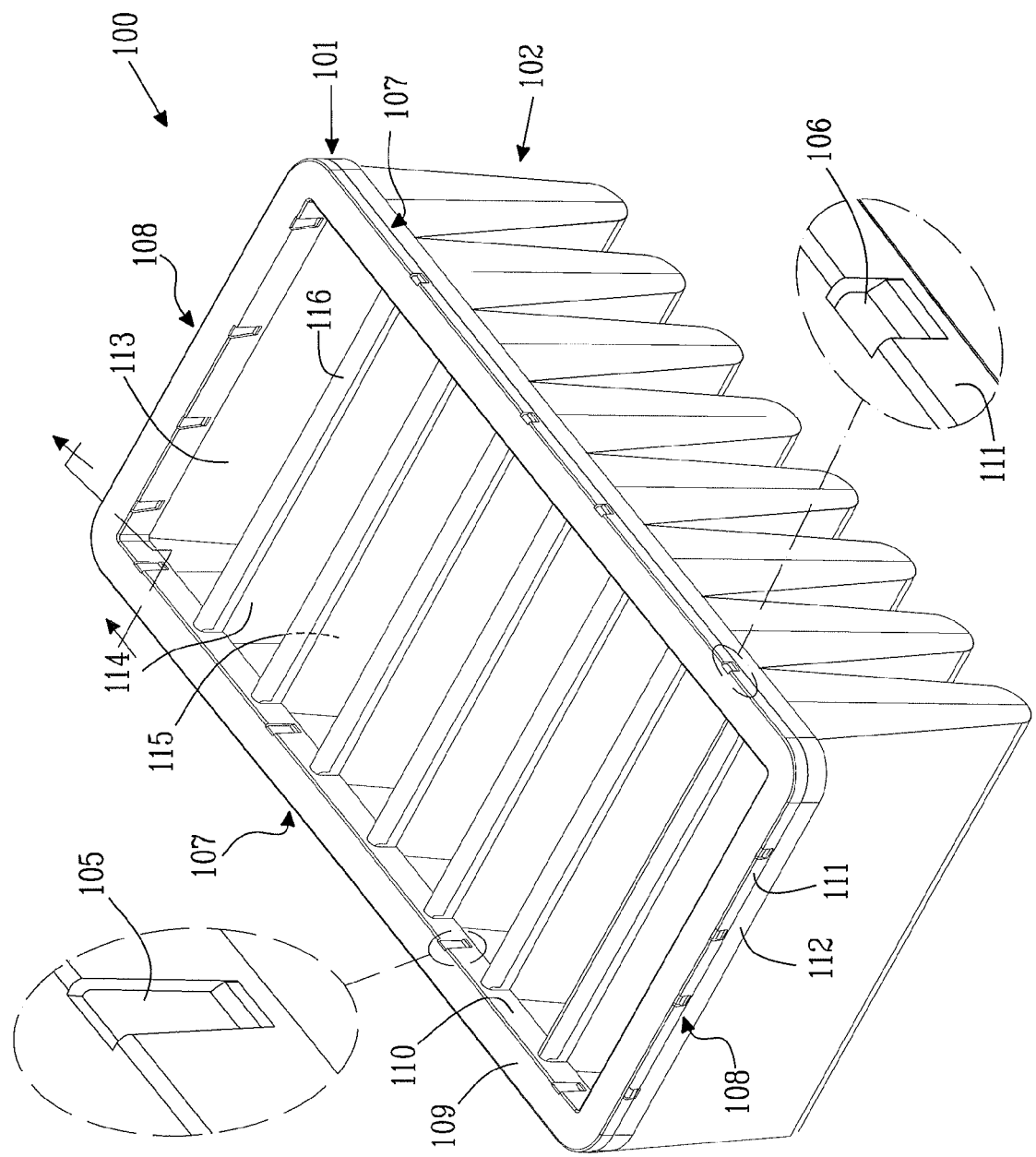
FIG. 1 is a schematic view of a gas filter assembly according to the invention wherein the locking elements are shown in detail in the inserts.

In the following the gas filter assembly of invention will be described in a non-limiting way and in more detail with reference to exemplary embodiments illustrated in the enclosed drawings, in which the first digit of the reference numerals refers to the figure in which the element is shown, while the two subsequent digits denotes the particular element.

FIG. 1 illustrates a gas filter assembly 100 in accordance with the invention, said assembly comprising a support frame 101 having a square or rectangular design and a number of filter pockets 102 attached thereto. The gas filter assembly of the invention is designed as a cartridge cassette which may be inserted into a ventilation unit generally intended to be used for removing contaminations such as solid particles and gaseous contaminations from an air flow.

The support frame 101 of the invention is composed of a first subframe 203 and a corresponding second subframe 204 (see FIG. 2) that when connected to each other by means of at least one locking element 105,106 form four peripheral sides 107, 108; two longitudinally extending sides 107 placed opposite to each other and two transversally extending sides 108 facing each other. If the support frame 101 has a square design, the four peripheral sides will be of equal length. However, if the support frame has a rectangular design the two longitudinally extending sides 107 will generally be longer than the two transversally extending sides 108. The following description including the figures will describe a rectangular support frame, it should however be understood that the same description applies to a support frame having four peripheral sides of equal length instead of the two transversally and two longitudinally extending sides referred to in the text below.

When connected together, the first subframe 203 constitutes the inner wall 110, the first face 109 (i.e. the side facing the air flow), and part of the outer wall 111 of the support frame. The second subframe 204 forms a back side, (i.e. the side downstream the air flow) and the main part of the outer wall 112 of the support frame 101. Each subframe 203, 204 is preferably manufactured using an injection molding technique and is designed in one piece from a destructable and/or recyclable plastic material known in the art. It is advantageous to make the subframes as single pieces as opposed to frames wherein the sides are assembled using connecting corner pieces as is often used in the art. Subframes made in one piece offer a better stability.

The first and second subframes 203, 204 each exhibit inner cross sectional profiles designed so as to fit cooperatively together when connected by means of locking elements 105, 106 (see inserts in FIG. 1). The shape and function of the inner profiles of the subframes 203, 204 will be described in greater detail below.

The gas filter assembly is especially intended for filtering air and other gases. Each filter pocket 102 is made from a filter medium known per se (e.g. glass or synthetic fibres), and may be manufactured in any conventional way known in the art. One preferred method of manufacture is when two identical pieces of filter medium having a square or rectangular shape are arranged on top of each other and joined together, preferably by sewing, welding or gluing along three of the sides, leaving one side open so as to form the air inlet opening 113 of the filter pocket 102. Alternatively one rectangular piece of filter medium is folded in half at the midpoints of the longer sides of the rectangle and the two sides adjacent to the fold are sewn, welded or glued together leaving the side opposite to the fold open to form the air inlet opening 113. The air inlet opening 113 is defined by the first and the second upper edges 114, 115 of the filter medium pieces respectively.

Figure 3:
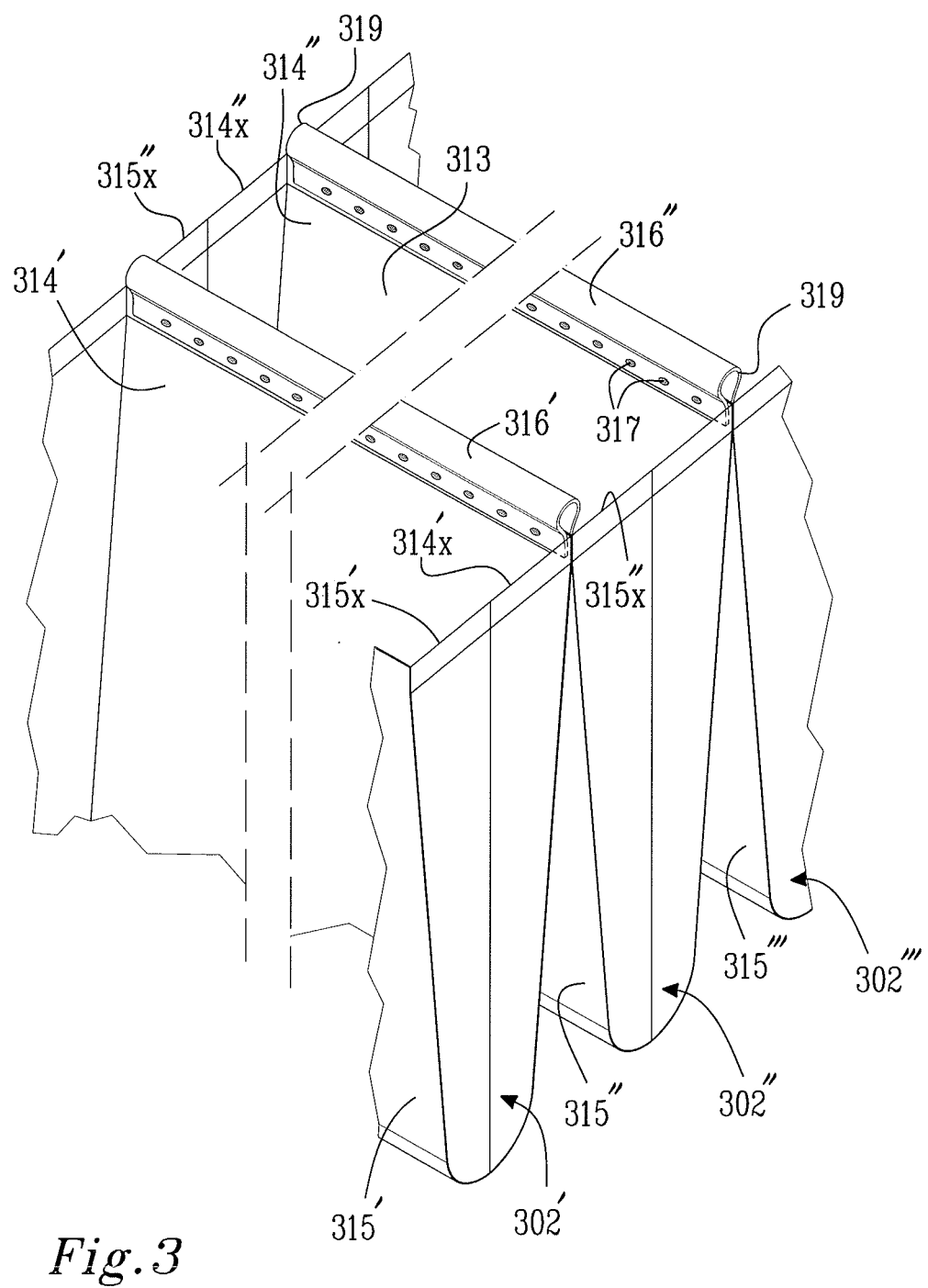
FIG. 3 is a schematic partial view of the pocket filter assembly.
Figure 4:
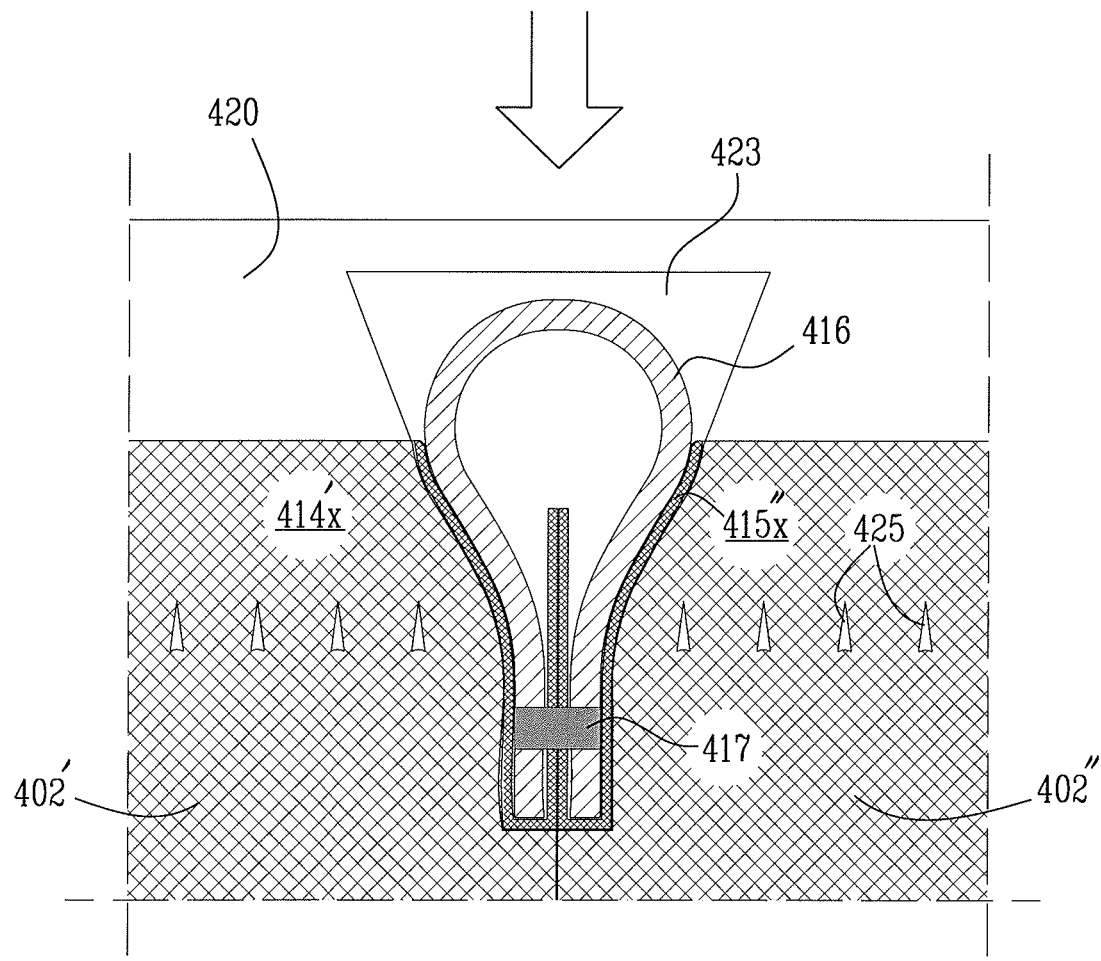
FIG. 4 is a schematic cross-sectional view of the connecting means arranged in a slot on the slanted upper side of the second subframe.

Two or more filter pockets 302', 302" are sealingly secured to each other by means of a connecting means 316 preferably in the shape of elongated clamping strips that extend separately and substantially parallel to each other between the longitudinally extending sides 107 of the support frame 101 (see FIG. 3). Each connecting means 316 is preferably made by extrusion or injection molding of a polymer material such as for example a plastic material of the group comprising polypropylene and polyethylene. The connecting means 316 may have any cross-section that will fulfill the requirements discussed below. However, the general cross sectional shape as shown in FIG. 4 exhibits many advantages. The connecting means 316 serves several purposes wherein the primary purpose is to secure the filter pockets 302', 302" to each other in a dust free manner. This means that no air whether it contains dust and particles or not, will be able to pass between the pockets, but will pass through the filter medium. Another purpose is to support the filter pockets and prevent them from collapsing in strong air flow. Preferably the upper part of the connecting means 416, i.e. the top side facing the air flow (the air flow is marked with an arrow in FIG. 4), has a rounded shape which permits the connecting means 416 to be made from a lighter and thinner material while still being able to resist bending or crumpling in strong draught. A further advantage of the rounded shape is that the pressure drop created at the air inlets 313 is lower with this particular rounded design.

Each connecting means 316 connects two adjacent filter pockets 302' and 302" by bridging the first upper edge 314' of a first filter pocket 302' and the second upper edge 315" of an adjacent second filter pocket 302", so as to form a dust tight seal between the two filter pockets. As can be seen in FIG. 4, the lower part of the connecting means 416 may be narrower so that the two sides of the strip clamp the top edges 414', 415" of two adjacent filter pocket sides together. However, the lower part may be straight as the connecting means 316 is preferably secured to the filter pockets by for example spot welding or gluing 317. Any desired number of filter pockets 302 can be connected together using the connecting means 316 in the above described manner, so as to form a pocket filter assembly 318.

The connecting means 316 exhibit two opposite end portions 319, and in the collapsed state (not shown), i.e. when the pocket filter assembly is not mounted in the support frame, the upper edges 314x', 315x" of the filter pockets 302', 302" extend past the two end portions 319 of the connecting means 316. This means that the connecting means 316 is shorter than the length the upper edges 314, 315 of a filter pocket 302. The reason for this will be described below.

Figure 5:
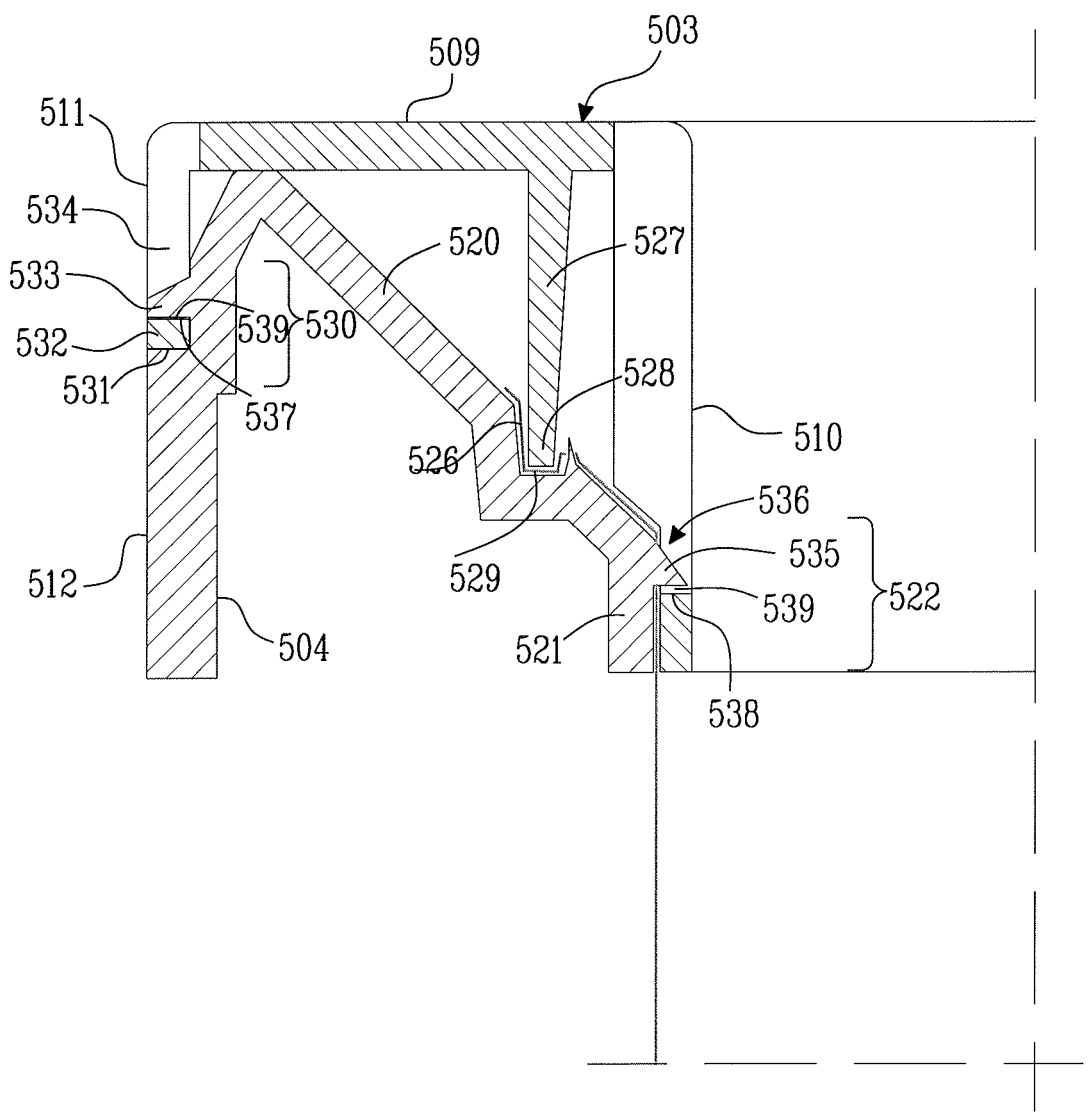
FIG. 5 is a schematic cross-sectional view of the first and second subframes when secured to each other by means of the locking elements.

The interior cross sectional profile of the second subframe 504 (i.e. the side facing the interior of the first subframe 503, see FIG. 5) exhibits a slanted upper side 520 which slopes diagonally from the outer edge of the front side 509 towards the lower inner wall 510 of the support frame 501 (see FIG. 5). When the diagonally slanted upper side 521 reaches the inner wall 510 it inclines so as to form a vertical wall 521 which runs parallel to and thereby forms an overlap area 522 with the inner wall 510 of the first subframe 503. The slanted upper sides 220 of the two longitudinally extending sides 207 are provided with a number of slots 223 spaced at a distance from each other equal to the width of a filter pocket 202 in the fully expanded state, which also equals the distance between two adjacent connecting means 216 of the pocket filter assembly 218. The number of slots 223 is equal to the number of connecting means 216 present in the pocket filter assembly 218. When mounted in the support frame 101 each end portion 219 of the connecting means 216 in the pocket filter assembly 218 extends through cut-in portions 224 provided in the two opposing inner walls 210 of the longitudinally extending sides 207 of the first subframe 203 and rests in the slots 223 in the inner cross sectional profile of the second subframe 204. The cut-in portions 224 in the front subframe inner walls 210 are aligned with the slots 223 of the second subframe 204 and are equal in number with the number of connecting means 216 of the pocket filter assembly 218.

As pointed out above, in the collapsed state the total length of the connecting means 316 is shorter than the length of the upper edges 314, 315 of the filter pockets 302, and filter medium upper edges 314x, 315x extend past each end portion 319 of the connecting means 316. However, in the mounted condition the upper edge 314x' of the filter pocket material belonging to the left hand side filter pocket 302' is folded towards the left at each end portion 319 of the connecting means 316, and the upper edge 315x" of the filter pocket material belonging to the right hand side filter pocket 302" is folded towards the right as can be seen in FIG. 3. The shape of the slots 423 is generally square or U-shaped and has a width and depth so as to fit the cross-section of the connecting means 416 including the filter material belonging to the filter pocket upper edges 314x', 315x" of two adjacent filter pockets 402', 402" (see FIG. 4). In one preferred embodiment of the invention the slots 223 on the second subframe have a V-shape so as to secure each end 219 of the connecting means 216 in a clamping grip when the strips are placed in the slots 223.

When the end portions 219 of each connecting means 216 in a pocket filter assembly 218 are mounted in their slots 223 of the second subframe 204, each filter pocket 202 between two connecting means 216 is pulled open so as to form a generally rectangular air inlet opening 213. The air inlet opening 313 is bordered in the transverse direction of the support frame by two parallel connecting means 316, and in the longitudinal direction, (i.e. the short ends of the filter pockets), by the upper edges 314x", 315x" of the two pieces of filter medium that extend past the end portions 319 of the connecting means 316. The outermost filter pocket at each side of the filter assembly 218 is connected to only one adjacent filter pocket, leaving the outermost upper edges 214', 215" of the filter pockets 202', 202" facing the transversally extending sides 208 of the second subframe 204 unattached.

In order to secure the outermost upper edges 214', 215" of the end filter pockets 202', 202", the diagonally slanted sides 220 on the second subframe's transversally extending sides 208 are provided with a number of hooking elements 225, onto which the upper edges 214' 215" of the filter medium may be hooked or fastened. Such hooking elements or means may also be a serrated edge. The areas between the slots 423 on the diagonally slanted upper sides 420 of the back frame longitudinally extending sides 207 are also preferably provided with hooking elements 425, onto which the short end upper edges 414x', 415x" of the filter pockets 402', 402" may be fastened (see FIG. 4). By means of said hooking elements 225 provided along the diagonally slanted upper sides 220 on both the longitudinally and transversally extending sides 207, 208 of the second subframe 204, the entire peripheral upper edge 226 (i.e. the upper edges 214', 215" of the outermost filter pockets and the short ends 214x, 215x of all filter pockets) of the pocket filter assembly 218 can be fastened to the diagonally slanted upper sides 220 of the second subframe 204.

As can be seen in FIG. 5, the inner profile of the first subframe 503 is generally U-shaped wherein a first leg of the U forms the inner wall 510 of the support frame 501 and the second leg which is shorter than the first, forms the upper part of the outer wall 511. However, in order to further secure the filter medium peripheral upper edge 526 of the pocket filter assembly 218, the interior profile of the first subframe 503 is provided with a partition 527 that extends downwards from the interior of the front face 509 towards the diagonally slanted upper side 520 on the second subframe 503, and in parallel with the entire inner wall 510 of the first subframe 503. The lower edge 528 of the partition 527 extends into a groove 529 provided behind the hooking elements 525 on the diagonally slanted upper side 520 of the second subframe 503. When the front 503 and back 504 subframes are assembled together the lower edge 528 of the partition 527 presses the entire peripheral upper edge 526 of the filter medium that is hooked onto the hooking elements 525, down into the groove 529, thereby securing the pocket filter assembly to the support frame in a dust free manner.

Figure 6:
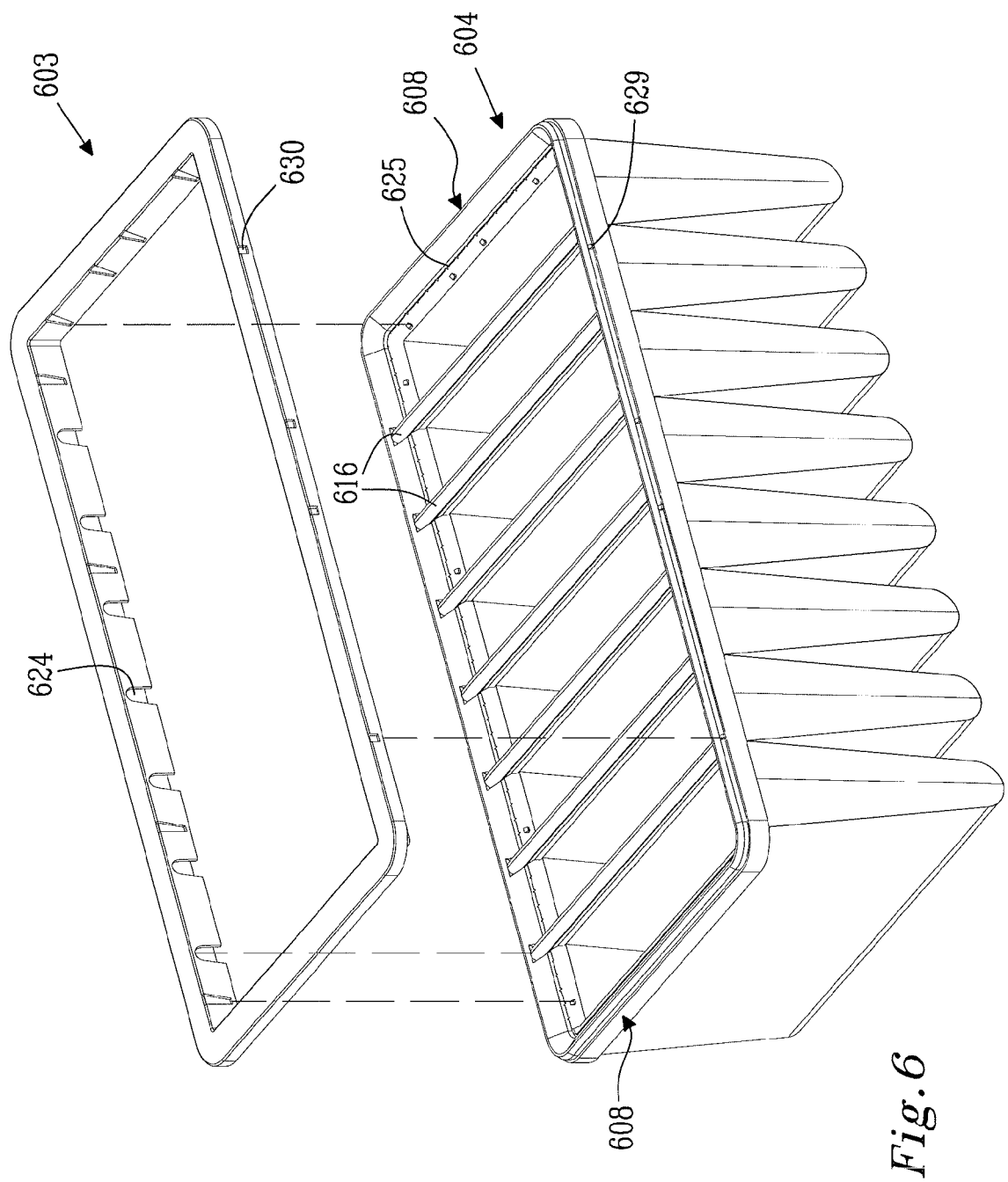
FIG. 6 is a schematic perspective view showing the fitting of the first subframe onto the second subframe.

The pocket filter assembly is further secured to the support frame by the fitting of the first subframe 603 on top of the second subframe 604 having the entire peripheral edge 526 of the filter pocket assembly fastened to its hooking elements 625 (see FIG. 6). The cut-in portions 624 on the longitudinally extending sides 607 of the first subframe 604 are aligned to fit across the connecting means 616 of the pocket assembly, and the first subframe 603 is secured to the second subframe 604 by means of locking elements 105, 106 provided in the outer 111 and inner 110 walls of the support frame 101. Furthermore, as can be seen in FIG. 5 that the entire peripheral upper edge 526 of the filter medium is secured to the support frame by means of the partition 527 pressing the filter medium down into the groove 529. By this design the entire upper edge 526 of the filter pockets and end portions 219 of the connecting means 216 are securely fastened to the support frame 101 and will not easily unfasten or come loose. The main function of the locking elements 105, 106 is therefore merely to connect the front 203 and back 204 subframes together. It is thus obvious to the person skilled in the art that the design of the locking elements is not crucial in the present invention as long as they fulfill the requirement of securing the two subframes 203, 204 to one another. However, a preferred design will now be described.

As mentioned above, the first subframe 503 covers part of the outer wall 511 as well as the front face 509 and inner wall 510 of the support frame 501. This can be seen in FIG. 5 wherein the first subframe 503 extends from the inner wall 510, across the front face 509 and partly overlaps the outer wall 511 of the second subframe 504. This area of overlap 530 is bordered by a ledge 531 formed in the outer wall 512 of the second subframe 504 onto which the edge 532 of the first subframe outer wall 511 rests. A number of outer wall locking elements 106 are distributed in the overlap area 530 all around the outer wall 111 circumference. Each outer wall locking element 106 comprises an outer wall locking projection 533 provided on the second subframe 504 outer wall overlap area, and an outer wall co-operating locking hole 534 arranged on the first subframe outer wall overlap area 530.

A number of inner wall locking elements 105 are distributed throughout the inner wall circumference. Each inner wall locking element 105 comprises an inner wall locking projection 535 provided in the overlap area 522 of the vertical wall 521, and a co-operating locking hole 536 on the first subframe inner wall overlap area 522.

The function and design of the preferred locking elements 105, 106 described above are similar, although they are placed on different walls of the support frame 101. The cooperating locking holes 534, 536 of the locking elements 105, 106 are both through-holes in the first subframe inner 510 and outer 512 walls respectively and have a lower flat abutment ledge 537, 538 onto which flat abutment surfaces 539, 540 of the locking projections 533, 535 respectively, are adapted to co-operate with said lower flat abutment ledges 537, 538 when the front and second subframes 203, 204 are locked together.

In one embodiment of the invention, all four inner walls 110 of the support frame are designed to receive end portions 219 of connecting means 216. The four inner walls may have the same number of slots/cut-in portions on all walls. However in another embodiment, the number of slots/cut-in portions arranged on the transversally extending inner walls is different from the number of slots/cut-in portions arranged on the longitudinally extending inner walls (not shown). This feature will make the support frame 101 more flexible as it can be arranged to hold pocket filter assemblies having different numbers of filter pockets. For instance, the support frame may hold a pocket filter assembly comprising 8 filter pockets if the pocket filter openings in their longitudinal direction extend between the longitudinally extending sides 107 of the support frame, while it may hold a pocket filter assembly comprising 6 filter pockets if the pocket filter openings extend in their longitudinal direction between the transversally extending sides 108 of the support frame. The person skilled in the art will realize that the number of filter pockets as well as slots/cut-in portions arranged on the transversally and longitudinally extending inner walls 110 of the support frame may vary according different standards within the technical field of gas filter assemblies and may also apply to support frames having a square design.

Figure 2:
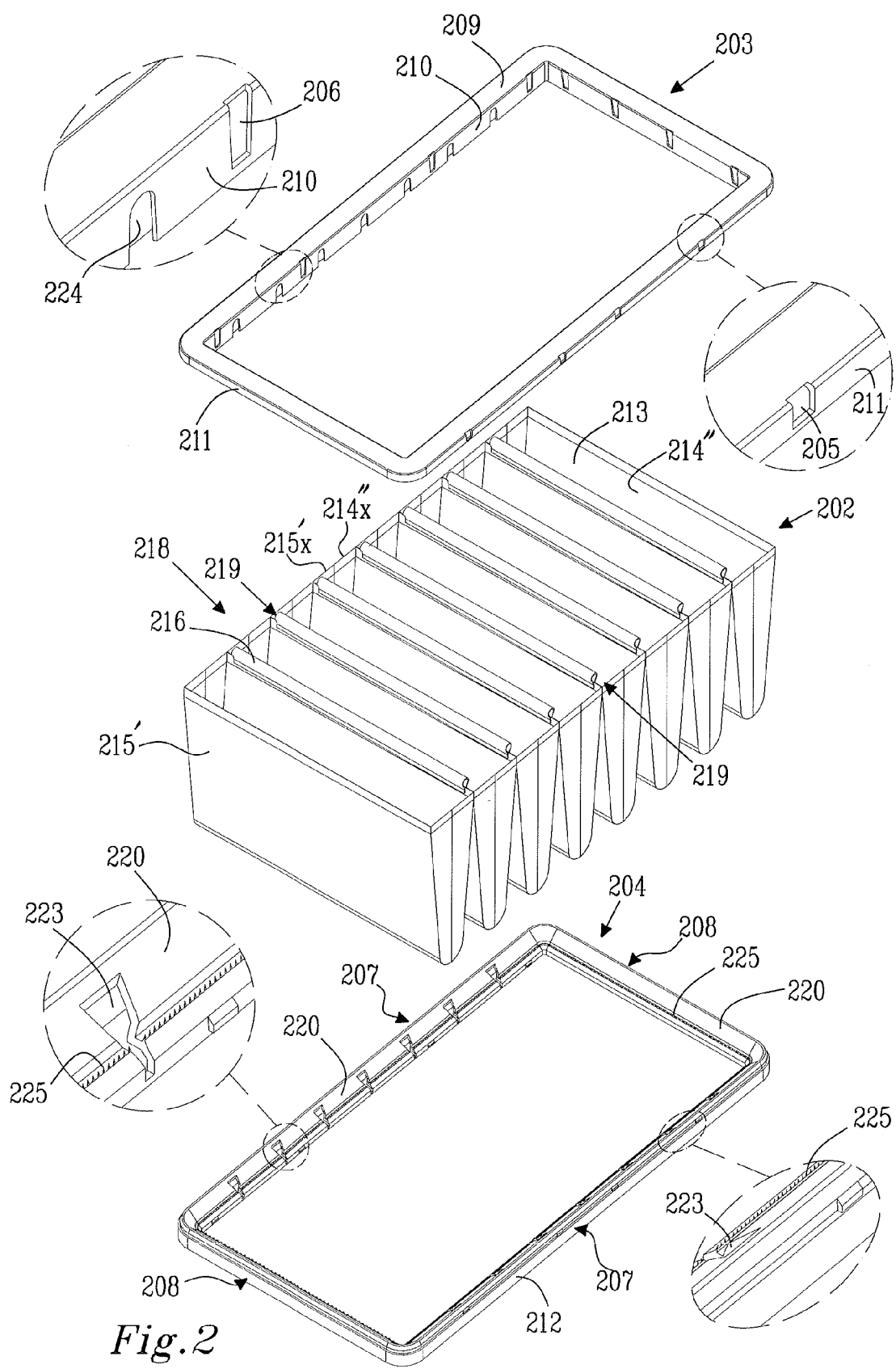
FIG. 2 is a schematic exploded view showing the first and second subframes and the pocket filter assembly of the gas filter assembly.

As is obvious to the person skilled in the art a gas filter assembly according to the invention can be assembled in a very quick and simple way as can be seen in FIG. 2. Advantageously the connecting means 216 connects two adjacent filter pockets 302' and 302" by bridging the first upper edge 314' of a first filter pocket 302' and the second upper edge 315" of an adjacent second filter pocket 302", so as to form a tight seal between the two filter pockets. The connecting means 216 are preferably further secured to the filter pockets by spot welding or gluing 317. Any desired number of filter pockets can be assembled so as to form a pocket filter assembly 218.

The pocket filter assembly 218 is thereafter assembled into the second subframe 204 by fitting each end portion 219 of the connecting means 216 into the slots 223 of the second subframe 204. Thereafter the entire peripheral upper edge 226 (i.e. the upper edges 214', 215" of the outermost filter pockets and the short ends 214x, 215x of all filter pockets) of the pocket filter assembly 218 are hooked onto the hooking elements 225 arranged on the diagonally slanted upper sides 220 of the second subframe 204.

Finally the first subframe 203 is assembled to the second subframe 204 and the pocket filter assembly 218 by aligning the cut-in portions 224 on the first subframe inner walls 210 with the slots 223 of the second subframe 204 and the clamping strips 216 of the pocket filter assembly 218 positioned therein. The inner and outer wall locking elements 205,206 are closed and thereby the lower edge 528 of the partition 527 presses the entire peripheral upper edge 226 of all filter pockets into the groove 529 provided behind the hooking elements 225 on the diagonally slanted upper side 220 of the second subframe 203, in this manner securing the pocket filter assembly 218 to the support frame in a dust free manner.

From the disclosure above it can be concluded that the gas filter assembly of the present invention is easy to produce, assemble and mount. Furthermore, due to its construction with the connecting means and entire peripheral upper edge of the filter pockets being securely fastened between the first and second subframes, a stable and dust free sealing of the pocket filter assembly is provided that not easily will come undone even in strong drought.

The invention claimed is:

1. A gas filter assembly comprising a support frame and a number of filter pockets, said support frame comprising a first subframe and a second subframe, each are designed as one piece and connected to each other by means of at least one locking element, said first and second subframes constituting an inner wall, a front face and an outer wall of the support frame when connected together, each filter pocket having an air inlet opening at one end defined by opposing sides each having an edge, wherein the filter pockets are sealingly secured to each other by at least one connector having two opposite end portions, said at least one connector bridging between and extending along substantially the entire length of the edges of two adjacent filter pockets forming a pocket filter assembly, said pocket filter assembly with the at least one connector being mounted in the support frame such that each end portion is arranged between said first and second subframes by extending through cut-in portions in the inner wall of the first subframe and resting in V shaped slots arranged in the second subframe.

2. A gas filter assembly according to claim 1, wherein the support frame is square or rectangular.

3. A gas filter assembly according to claim 1, wherein the connector is elongated clamping strip.

4. A gas filter assembly according to claim 1, wherein the top side of the connector facing the air flow has a rounded shape.

5. A gas filter assembly according to claim 1, wherein the connector is connected to the filter pockets by spot welding or gluing.

6. A gas filter assembly according to claim 1, wherein the filter pockets sealingly secured by the connector have a peripheral upper edge and said peripheral upper edge is fixed to the second subframe by means of hooking device.

7. A gas filter assembly according to claim 6, wherein the peripheral upper edge is secured to the support frame by means of a partition on the first subframe pressing the peripheral upper edge into a groove arranged onto the second subframe.

8. A gas filter assembly according to claim 1, wherein two of the inner walls of the support frame are provided with cut-in portions and slots.

9. A gas filter assembly according to claim 1, wherein four of the inner walls of the support frame are provided with cut-in portions and slots.

10. A gas filter assembly according to claim 2, wherein the number of slots and cut-in portions arranged on transversally extending inner walls of the support frame is different from the number of slots and cut-in portions arranged on the longitudinally extending inner walls.

11. A gas filter assembly, comprising: a support frame and a preformed pocket filter assembly;
    said support frame including a first subframe and a second subframe,
        wherein said respective subframes are each formed as a unitary construction and are connected to each other by at least one locking element, said first and second subframes constituting an inner wall, a front face, and an outer wall of the support frame when connected together;

wherein said first subframe has cut-in portions in the inner wall and said second subframe has v-shaped slots aligned with the cut-in portions;

said preformed pocket filter assembly including:

at least two filter pockets, said respective filter pockets having opposing sides each with an elongated edge at one end, said respective elongated edges being spaced to define an air inlet opening; and an elongated connector extending between opposite end portions, said elongated connector extending along substantially the entire length of the respective elongated edges of two adjacent filter pockets and bridging between the two adjacent filter pockets for sealingly securing the two adjacent filter pockets to each other independent of the support frame; and wherein said preformed pocket filter assembly is mounted in the support frame such that each opposite end portion of the elongated connectors is arranged between said first and second subframes by resting in the respective v-shaped slots of the second subframe and extending into the respective cut-in portions of the first subframe.

\* \* \* \* \*